Aug. 28, 1934.  H. MORIER  1,971,655

MOTOR VEHICLE SAFETY BRAKE

Filed Jan. 20, 1932  3 Sheets-Sheet 1

INVENTOR
Henry Morier
by Bryant & Lowry
Attorneys

Aug. 28, 1934.　　　　H. MORIER　　　　1,971,655
MOTOR VEHICLE SAFETY BRAKE
Filed Jan. 20, 1932　　　3 Sheets-Sheet 2

Inventor
Henry Morier.
by
Bryant & Lowry
Attorneys.

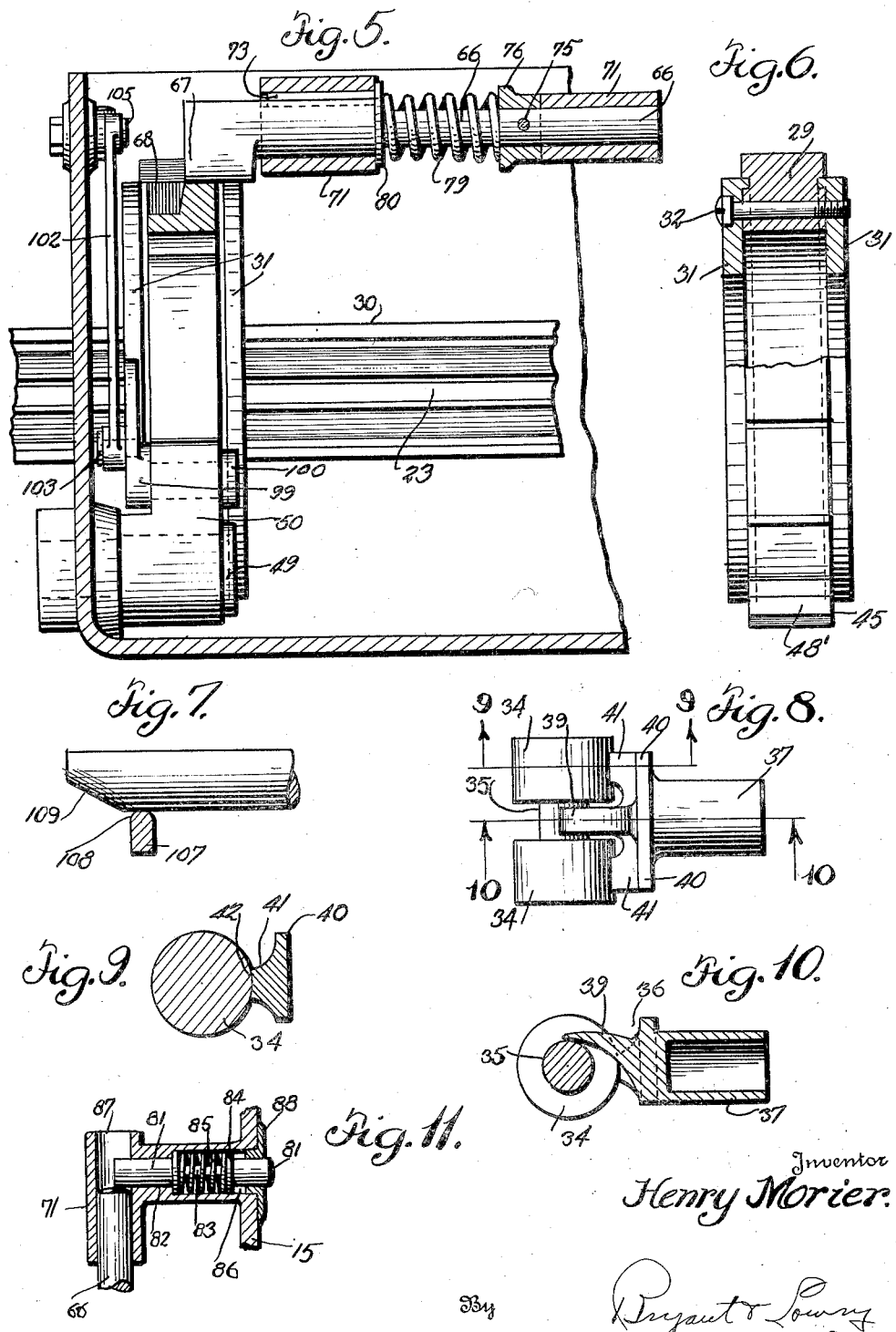

Patented Aug. 28, 1934

1,971,655

UNITED STATES PATENT OFFICE 1,971,655

MOTOR VEHICLE SAFETY BRAKE

Henry Morier, Plainville, Conn.

Application January 20, 1932, Serial No. 587,801

7 Claims. (Cl. 192—4)

This invention relates to improvements in motor vehicle safety brakes particularly adapted for preventing retrograde movement of the motor vehicle should the engine become stalled on an incline or to prevent the motor vehicle from coasting backward while stopping at street intersections governed by traffic regulations.

The primary object of this invention is to provide a device of the above mentioned character which is entirely automatic and which may be controlled by manual means to move the brake into and out of its operative position.

A still further object of this invention is to provide a device of the above mentioned character which when set by the manual means will be at all times in position to prevent the backward movement of the motor vehicle unless the gears are set in reverse directions whereupon the device is automatically thrown out of operation and allows the backward movement of the motor vehicle under its own power.

A still further object of this invention is to provide a device of the above mentioned character which is adapted to be associated with the gear shifting apparatus of a motor vehicle so that the same will not interfere with the operation thereof or in any way effect the gear shift control.

A still further object of this invention is to provide a device of the above mentioned character which will not require any manual control on the part of the operator other than the manual means which may be set to move the operative parts of the device into a locked position or release at the will of the operator.

A still further object of this invention is to provide a device of the above mentioned character associated within the transmission gear casing so that the device will be constantly lubricated from the gear lubricant contained in its own housing or gear casing.

A further object of this invention is to provide a device of the above mentioned character which may be easily incorporated in the present-day type of gear casing on motor vehicles without consuming considerable space and without requiring the altering of the gear casing or its construction.

Other advantages of the invention will become apparent during the course of the following description, forming a part of the specification and in which, Figure 1 is a fragmentary top elevational view of a gear casing showing the cover removed for illustrating the manner in which the automatic brake is installed on the driven shaft;

Figure 5 is a fragmentary longitudinal cross-sectional view of a motor vehicle transmission gear casing illustrating the manual operating device for moving the locking dog into and out of its operative position;

Figure 6 is a side elevational view of the rotary locking collar showing a portion thereof broken away to illustrate the construction thereof;

Figure 7 illustrates the manner in which the yoke gear operating rod is cut away to engage the tripping lever to move the parts out of their operative positions when the gear shifting rod is moved in the reverse position;

Figure 8 is an enlarged top elevational view of one of the roller holding members illustrating one of the rolls in place and showing the manner in which the same is reduced at its central portion for receiving the retaining finger;

Figure 9 is a cross-sectional view taken on line 9—9 of Figure 8, looking in the direction of the arrows illustrating the locking roller and showing the manner in which the holding finger is presented to the roller to bear upon the bearing surface of the roller;

Figure 1:
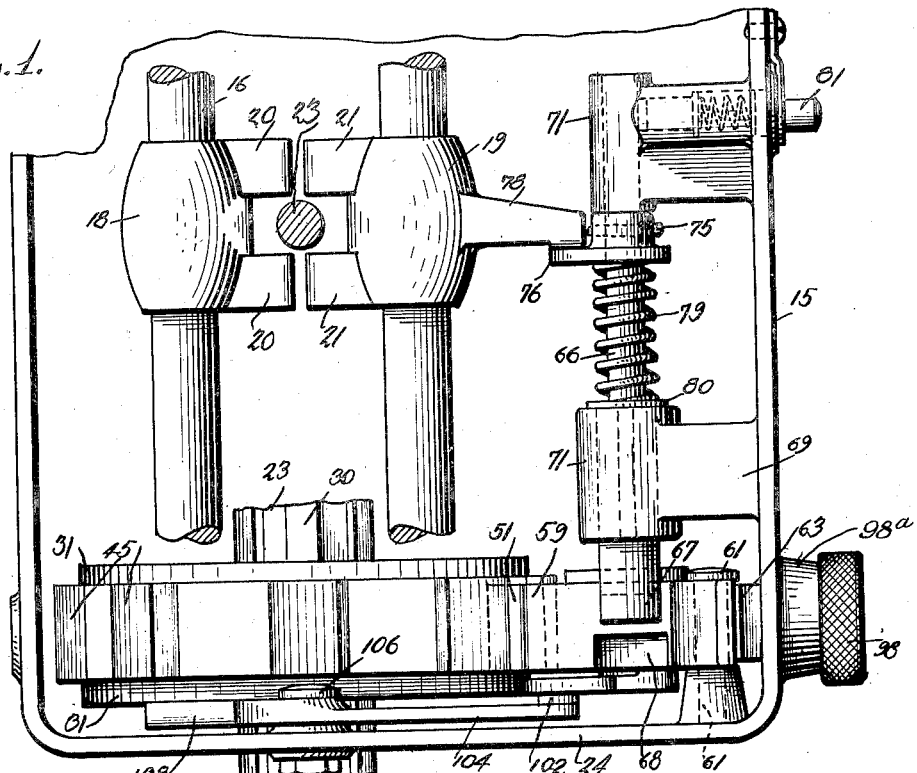
Figure 4:
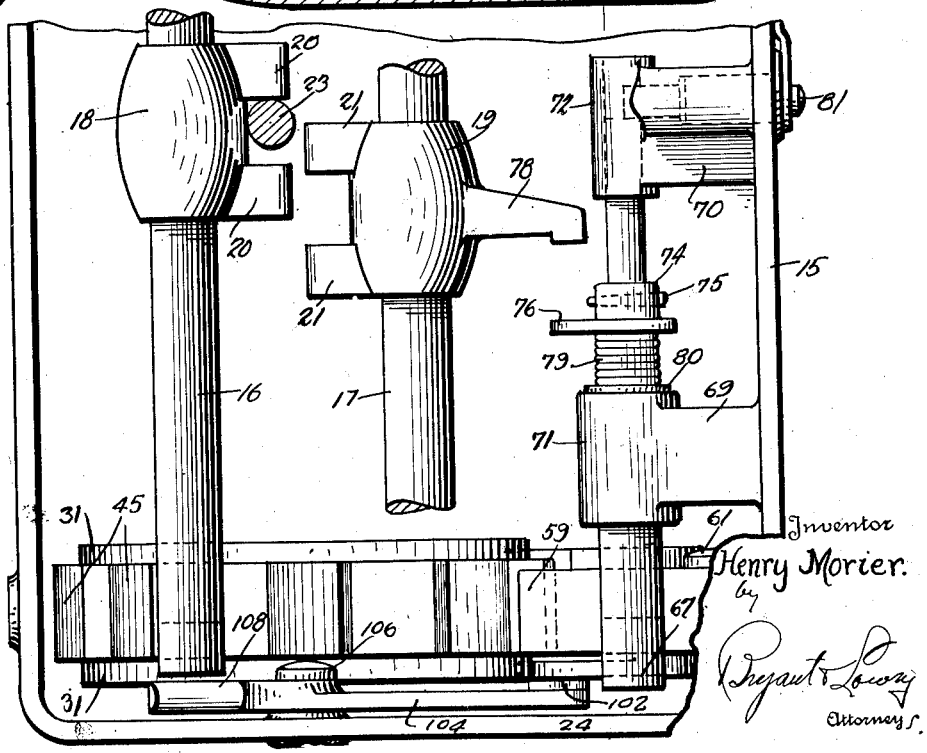
Figure 4 is a fragmentary top elevational view of a gear casing showing the cover removed, illustrating the gear shifting yoke and showing one of the same moved to the reverse position to illustrate the manner in which the locking dog may be moved out of engagement with the toothed rotary member.

Figure 10 is a longitudinal cross-sectional view taken on line 10—10 of Figure 8, looking in the direction of the arrows, illustrating further the construction of the retaining member and the manner in which the retaining finger is presented to the locking roller; and Figure 11 is a cross-sectional view of the manually operative device for moving the holding dog to its released position more clearly shown in Figures 1 and 4.

In the drawings, wherein for the purpose of illustrating the invention and wherein like reference characters will be employed to designate like parts throughout the same, the reference character 15 will generally be employed to designate a motor vehicle gear shifting transmission casing having the usual slide rods 16 and 17 provided with respective collars 18 and 19, having yokes 20 and 21 adapted to be engaged by the gear shifting rod 23 which may be moved into engagement with the yoke arms 20 to move the rod 16 to first gear and reverse gear positions, while the gear shifting rod 23 may be moved into engagement with the yoke arm 21 to move the sliding rod 17 to second gear and third gear positions. This construction is of the conventional type usually employed in motor vehicle transmission gear casings wherein the rods 16 and 17 are provided with gear engaging yokes for sliding the gears to their gear changing positions. Such construction is usually arranged in the upper portion of the transmission gear casing and the driven shaft 23 passes through the rear wall 24 as clearly illustrated in Figures 1, 2 and 3 and 5.

The invention comprises a rotary collar 25 having a plurality of cam faces 26 and opposite pairs of extensions 27 having outer faces rounded or curved at 28 to engage the inner periphery of a floating collar 29. The rotary collar 25 is splined on the shaft 23 by means of the ribs 30 entering corresponding slots 31 in the collar 25 whereby rotation of the collar 25 on the driven shaft 23 is prevented. Mounted on opposite sides of the floating collar 29 are retaining rings 31 held in place by machine screws 32 to prevent the floating collar 29 from moving axially relative to the cam collar 25 on the shaft 23. The retaining rings 31 may be held in place by providing flanges on the outer peripheries thereof adapted to be anchored in annular grooves on the side edges of the floating collar 29.

Figure 2:
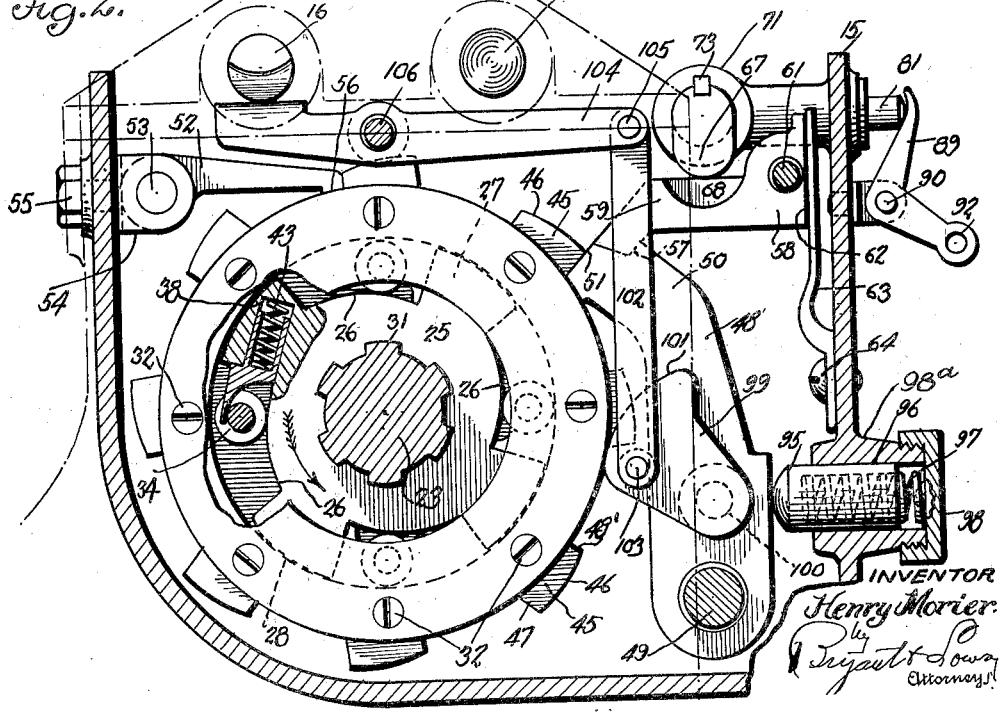
Figure 2 is a transverse cross-sectional view through a motor vehicle gear casing illustrating the association of the different elements embodying this invention.
Figure 3:
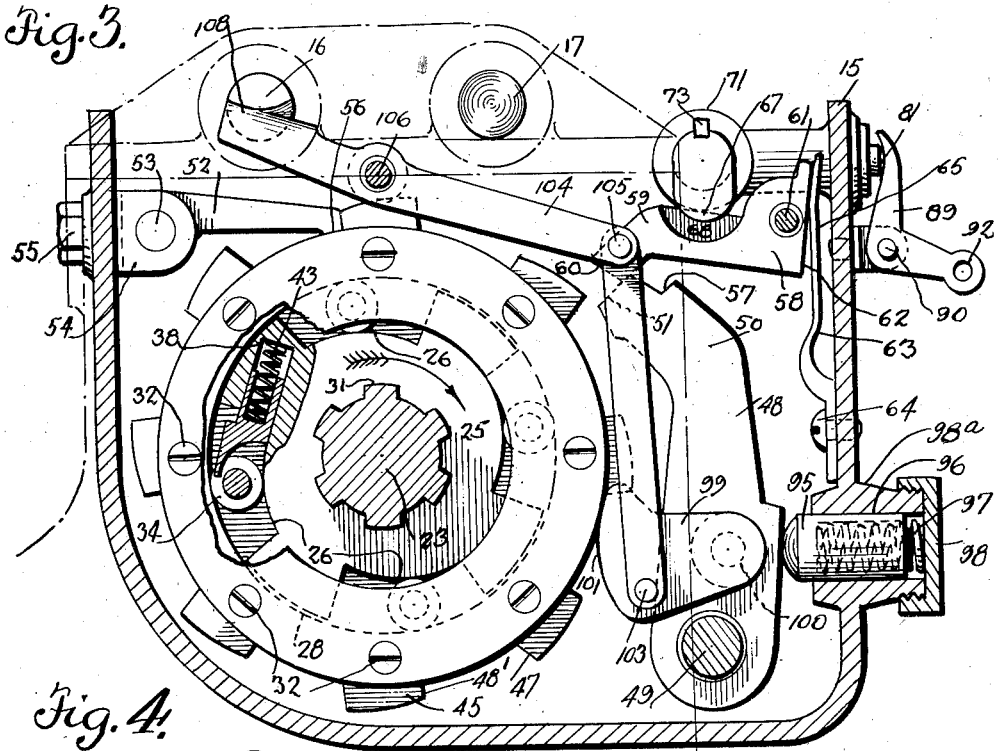
Figure 3 is a vertical transverse cross-sectional view similar to Figure 2, illustrating the automatic brake and its associated parts and showing the locking dog moved to its inoperative position.

It is intended that the floating collar 29 be capable of rotary movement on the opposite pairs of extensions 27 so that if the floating collar 29 is held stationary the cam collar 25 may rotate therein in a counterclockwise direction as shown in Figure 2. To prevent the rotation of the floating collar 29 in a counter-clockwise direction relative to the cam collar 25, a plurality of locking rollers 34 are interposed between the cam faces 26 of the cam collar 25 and the inner periphery of the floating collar 29. Each of the rollers 34 is provided with reduced central portions 35 as clearly illustrated in Figures 8, 9 and 10 so that a retaining member 36 may hold the rollers 34 out of engagement with the inner periphery of the floating collar 29 while the cam collar 25 is rotating in the direction shown by the arrows in Figure 2. The retaining member includes a tubular portion 37 slidably mounted in a bore 38 formed in the extension 27 and is disposed tangentially to the cam collar 25 whereby the centrifugal force applied to the rollers will hold them into engagement with an extension finger 39 formed on the closed end of the tubular retaining member 37. The tubular member 37 is provided with oppositely extending arms 40 having projections 41 adapted to engage the enlarged portions of the rollers 34 as clearly illustrated in Figure 9 as at 42. A coil spring 43 is mounted in the bore 38 and extends into the tubular portion 37 of the retaining member 36 as clearly illustrated in Figures 2 and 3 so that the locking rollers 34 will be moved to their locking position as shown in Figure 3 from the position shown in Figure 2.

The locking roller retaining member 36 forms an important part of this invention and it is believed obvious that the tubular portion 37 thereof is moved into the bore 38 against the tension of the coil spring 43 by centrifugal force. In this manner the locking rollers 34 are held out of engagement with the inner periphery of the floating collar 29 to prevent the rollers from dragging and causing the same to be faceted and throwing the roller out of round and simultaneous effectiveness of the device as a brake and at the same time creating a condition which may cause the breakage of the driven shaft or its associated parts.

The outer periphery of the floating collar 29 is provided with a series of equi-spaced lugs 45 having curved outer faces 46 and side faces 47 and 48' which extend more or less angular to the axis of the driven shaft 23. The lugs 45 are adapted to be engaged by a retaining dog 48 pivoted to the transmission casing 15 by means of a bearing shaft 49. The dog 48 is provided with a curved upper portion 50 which terminates in a flat surface or face 51 angularly disposed relative to the longitude of the dog 48. It is intended that the angular face 51 engage the angular face 47 of one of the lugs 45 in a manner clearly illustrated in Figure 2 to prevent the floating collar 29 from rotating in a clockwise direction while the pivot dog 52 is also pivoted to the transmission gear casing 15 as at 53 for preventing the counter-clockwise rotation of the floating collar 29. The dog 52 is pivotally mounted on the pin 53 between a clevis 54 which is held to the side wall of the transmission casing by means of a nut 55 threaded on the shank portion of the clevis. On the outer end of the pivoted dog 52 there is provided an angular portion 56 which may engage the angular face 48' of the lug 45 whereupon the floating collar 29 will be held stationary when the dogs 48 and 52 are in place. Under certain driving conditions, in the first, second and third transmission speed it is desired that the dog 48 engage one of the lugs 45 as shown in Figure 2 when the driven shaft 23 is rotating in the direction as shown by the arrow. In this position, should the motor vehicle stall on an inclined surface, the car on which the device is installed will not move rearwardly which frequently results in confusing the driver thereby presenting the cause for an accident. Should for any reason whatsoever the driver of the motor vehicle desire to throw the device entirely out of operation, a manual control device may be operated from the dash board whereby the pawl 48 may be released from the engagement with one of the lugs 45 to permit the rotation of the shaft 23 in the direction as shown in Figure 3. The manual unlocking means will be described in a following paragraph.

It will be noted that the dog 48 is provided with a cut out portion 57 at the free end thereof formed in the upper portion of the angular section 50 with which a locking dog 58 is adapted to engage and said locking dog 58 is provided with an angular portion 59 having an angular end face 60 which is adapted to engage the angular face 57 of the cut out portion. It will be noted that, were the dog 58 not provided, the bevel of the face 47 would throw the dog 48 into the position shown in Fig. 3 should the shaft rotate in reverse, this being the direction shown by the arrow in that figure. When, however, the dog 58 is in the position shown in Fig. 2, the dog 48 cannot disengage from the lug 45 with which it is engaged. The locking dog 58 may be pivoted to the gear transmission casing as at 61 and it is to be noted that the locking dog 58 adjacent the pivot point 61 is enlarged to provide a flat bearing face 62 upon which a leaf spring 63 is adapted to engage. The leaf spring 63 may be secured to the transmission casing 15 by screw 64 to normally hold the locking dog 58 into engagement with the cut away portion 57. In the position shown in Figure 3, the free end 65 of the leaf spring 63 is shown engaging the upper portion of the locking dog 58 and in this position, the locking dog 58 is moved out of position relative to the dog 48 for allowing the rotation of the floating collar 29 in the direction shown by the arrow in Figure 3.

The locking dog 58 forms one of the important parts of the manual control means operable from the dash board and said locking dog 58 may only be raised from its locked position when the controlling shaft 66 is moved to such a position as to bring the enlarged end 67 into registry with the cut away portion 68 formed in one side of the locking dog 58. This allows for the vertical movement of the locking dog 58 so that the angular face 60 may be moved out of the cut away portion 57 thereby allowing the dog 48 to be moved out of engagement with the lug 45. The controlling rod 66 is adapted to slide in suitable bearings including bosses 69 and 70 extending inwardly from one of the side walls of the transmission casing and on the outer ends of the bosses 69 and 70 there are provided slide bearings 71 and 72. A slot is formed in the slide bearing 71 for receiving a locking key 73. The locking key 73 allows sliding movement of the manual sliding operating rod 66 but prevents rotary motion thereof so that the enlarged end 67 of the sliding operating rod 66 will be presented downwardly to be received in the cut away portion 68 in the locking dog 58. Secured on the reduced portion of the sliding operating rod 66 is a flanged collar 74 held in place by a locking key 75. Said flanged collar 74 is provided with an angular flange 76 adapted to be engaged by an operating arm 78 formed integral with the slide rod yoke member 19 on the shaft 17. Encircling the reduced portion of the manual sliding rod 66 is a coil spring 79 having one end bearing against the flange 76 while the opposite end is adapted to bear against a washer 80 abutting the end wall of the slide rod bearing 71.

Means is provided for holding the manual sliding rod 66 in a rearward position so that the enlarged end 67 will be in registry with the cut away portion 68 in the locking dog 58. Said means includes a bore 82 formed in the boss 70 for allowing the sliding movement of a locking pin 81 having a reduced portion 83 and a piston 84. A coil spring 85 is mounted in an enlarged portion 86 of the bore 82 to bear against the piston 84 formed integral with the sliding locking pin 81 while the opposite end of the coil spring 85 is adapted to engage the inner end of the enlarged bore 86. The locking pin 81 may be held in the enlarged bore 86 from displacement by means of a flanged nut 88 threaded in the bore 86 so that the outer end of the sliding locking pin 81 will extend on the outer side of the transmission gear casing 15. Pivoted to the outer wall of the transmission casing 15 is a bell crank 89 pivoted as at 90 having one of its ends presented to the locking pin 81 while the opposite end is provided with an aperture 92 for receiving a flexible cable or other motion transmitting device which is installed on the dash board of the motor vehicle, not shown.

It will be noted that the locking dog 48 is normally held into engagement with one of the lugs 45 by means of a plunger 95 slidably mounted in a bore 96 in the side wall of the gear casing 15 and said plunger 95 is provided with a bore for receiving a coil spring 97, the outer end of which is engaged by a screw cap 98 threaded onto the externally screw threaded portion of the boss 98a. Means is provided for moving the locking dog 48 out of engagement with the lug 45 against the tension of the spring pressed plunger 95 and includes a cam 99 pivoted as at 100 to the locking dog 48 near its pivoted end and said cam 99 is provided with a cam face 101 which may engage the periphery of one of the locking rings 31 on the floating collar 29. Pivoted to the cam 99 is a link 102 as at 103 and said link 102 is connected to a tilting lever 104 as at 105 whereby the rocking of the lever 104 mounted on the pivot point 106 will allow the cam 99 to move toward and away from the periphery of one of the retaining rings 31. Formed on the opposite end of the rocking lever 104 is a gear shift yoke rod engaging portion 107 having a curved face 108 adapted to be engaged by a beveled face 109 formed on the rear end of the first speed and reverse shifting rod 16. This construction is clearly illustrated in Figure 7 wherein the first speed and reverse gear shift rod is illustrated in side elevation and is presented to the curved face 108 of the rocking lever 104.

Under normal driving conditions in the forward speed, the locking dog 48 will assume the position shown in Figure 2 so that the free end face 51 will engage the angular side face 47 of the lug 45 to prevent rotation of the floating collar 29 in a clockwise direction. Since the driven shaft 23 is rotating in the direction of the arrow shown in Figure 2, the cam rollers 34 will be held out of engagement with the inner periphery of the floating collar 29 so that the driven shaft 23 may rotate to propel the motor vehicle in one of the three forward speeds. Should the motor vehicle stall on an incline, the cam collar 25 and shaft 23 will tend to rotate in a clockwise direction whereupon the cam rollers 34 will drop away from the retaining fingers 39 and will be moved between the inner periphery of the collar 29 and the cam faces 26 of the cam collar 25. Since the floating collar 29 is retained against rotation by means of the dog 48, the retrograde movement of the motor vehicle will be prevented until the operator of the motor vehicle accomplishes the task of starting the engine and again moving the motor vehicle in a forward direction, at which time the rollers 34 will be retracted due to the centrifugal force and retained in the retaining members 36 away from the inner periphery of the floating collar 29 to prevent the rollers from becoming faceted and out of round.

It will be noted that the manually controlled locking member including the end 67 of the sliding rod 66 is held into engagement with the dog 58 thereby holding the dog 48 in place. This position and arrangement of parts is clearly illustrated in Figure 2 and should the occasion arise when the driver or operator desires to move the car in a reverse direction, it is only necessary to operate the gear shift lever rod 23 to move the same into engagement with the yoke arms 21 and move the gear shift lever rearwardly so that the arm 78 on the collar 19 will engage the flange 76 and move the sliding rod 66 rearwardly thereby compressing the spring and operating the manual control from the dash board to move the locking pin 81 into engagement with the forward end of the sliding rod 66. This movement will bring the enlarged end 67 into registry with the cut-away portion 68 in the locking dog 58 so that the same may be moved upwardly against the tension of the leaf spring 63. The operator then moves the gear shift lever to its neutral position and further moves the gear shift lever into engagement with the yoke arm 20 so that he may move the gear shift lever forward to its reverse position thereby bringing the bevelled portion 109 over the curved portion 108 of the rocking lever 104 allowing the tilting of the rocking lever. This action has released the locking dog 58 which is now free to move upwardly and thus to release the dog 48. Since the device is now in reverse gear the shaft 23 will revolve in the direction of the arrow in Fig. 3 and the dog 48 will, by the action of the bevel face 47, move to the position there shown. It will be noted that, since the parts are running in grease not much bevel is necessary on the face 47 to effect this movement of the dog. Since the rings 31 also run, under these conditions in the direction of the arrow in Fig. 3 and since the movement of the rod 16 has left the lever 104 free to tilt, the friction of the member 99 on the ring 31 with the excess weight of the long arm of the lever 104 will cause the member 99 to drop as in Fig. 3 and hold the dog 48 from clattering against the lugs 45. Obviously, in passing again to forward position the movement of the rod 16 will tilt the lever 104 and raise the member 99 to allow the dog 48 to reengage.

With the gear shift lever in neutral the car may be moved, by pushing, in either direction, forwardly or rearwardly.

It is to be understood, that the cam collar 25 and the floating collar 29 may be mounted and positioned on the outside of the transmission casing as well as on the inside but it is preferred that the device be mounted on the inside of the transmission casing so that the same will be properly lubricated at all times.

It shall be further understood that minor changes may be made without departing from the scope and principle of the improvement herein illustrated and described, as for instance, a plurality of dogs engaging the floating collar may be used to accommodate heavy trucks or buses.

Having thus described the invention, what I claim is:—

1. In combination with a gear transmission, of a motor vehicle having a driven shaft, of a safety one way brake applied to the driven shaft to prevent retrograde movement of the motor vehicle, said safety brake including inner and outer race members, cam faces formed on the inner race member, roller clutch members interposed between the cam faces and the inner periphery of the outer race member, lugs formed on the outer race member, a pivoted dog mounted within the gear transmission casing adapted to be presented to the lugs, means operable by the movement of the gear set to a reverse position for moving the pivoted dog out of engagement with the lugs, said means including a cam pivoted to the dog adapted to engage the outer periphery of the outer race member, a tiltable link pivoted within the transmission casing, having one end presented to a portion of one of the gear set yoke rods, a link connecting the tiltable lever and the cam whereby movement of the gear set to the reverse position will allow the cam to engage the face of the outer race member and separate the pivoted dog from the lugs on the outer race member.

2. In combination with a motor vehicle variable speed transmission gear casing having a driven shaft, of a safety brake associated with the driven shaft, said safety brake comprising inner and outer race members, cam faces provided on the inner race member, roller clutch members interposed between the cam faces and the inner periphery of the outer race member, a series of lugs mounted on the outer periphery of the outer race member, a pivoted dog pivoted to the interior of the transmission casing for engaging the lugs, a cam pivoted to the dog adapted to engage the periphery of the outer race member, a tiltable link pivoted within the transmission casing having one end presented to the reverse and first speeds sliding yoke rod of the transmission casing, a link connecting the opposite end of the tilting lever to the cam, whereby movement of the reverse yoke rod to the reverse position will allow the lever to tilt thereby moving the cam into engagement with the periphery of the outer race member effecting the movement of the dog out of engagement with the lug and means for positively locking the dog into engagement with the lugs on the outer periphery of the outer race member.

3. In combination with a motor vehicle variable transmission gear set having a driven shaft, of a safety brake applied to the driven shaft including inner and outer race members, cam faces formed on the inner race member, clutch rollers interposed between the cam faces and the inner periphery of the outer race member, a series of radially extending lugs formed on the periphery of the outer race member, a pivoted dog mounted within the transmission casing adapted to engage the lugs, a cam pivoted to the pivoted dog, said cam being adapted to engage the outer periphery of the outer race member, a spring pressed plunger normally pressing against the pivoted dog for holding the same into engagement with the lugs and means operable by the movement of the gear sets to a reverse position, to allow the cam to effect the movement of the pivoted dog out of engagement with the lugs on the outer periphery of the outer race member.

4. In combination with a motor vehicle variable speed transmission gear set having a driven shaft, of a safety brake applied to the driven shaft comprising inner and outer race members, clutch means interposed between the inner and outer race members, lugs formed on the outer periphery of the outer race member, a pivoted dog pivoted within the transmission casing for engaging the lugs, a spring pressed plunger abutting the pivoted dog for normally holding the pivoted dog into engagement with the lugs, a cam pivoted on the pivoted dog adapted to engage the outer periphery of the outer race member, a tiltable link pivoted within the transmission casing having one end presented to the first and reverse speed sliding yoke rod, a cam face provided on the end of the sliding yoke rod for effecting the tilting of the tilting lever, a link connected to the opposite end of the tilting lever for connecting the cam whereby the cam may be caused to engage the outer periphery of the outer race member when the gear set is moved to the reverse position, a second pivoted dog mounted within the transmission casing adapted to engage the first mentioned pivoted dog and means controllable from the instrument board of a motor vehicle for positively locking the second mentioned dog into engagement with the first mentioned dog.

5. In combination with a motor vehicle variable speed transmission set having a driven shaft, of a safety brake applied to the driven shaft comprising inner and outer race members, said inner race member being rigidly secured to the driven shaft, a plurality of cam faces on the inner race member, said cam faces being in equi-distant spaced relation, opposite pairs of projections formed on the inner race member extending into engagement with the inner periphery of the outer race member, clutch rollers interposed between the cam faces of the inner race member and the inner periphery of the outer race member, tubular retaining members carried by the opposite pairs of extensions for engaging the clutch rollers to retain the same out of engagement with the inner periphery of the outer race member, each said retaining member comprising a tubular portion extending into a bore disposed tangentially to the driven shaft, a coil spring mounted in the bore and tubular member for normally holding the retaining member in an outermost position relative to the opposite pairs of extensions, arcuately curved fingers formed on the retaining members for engaging the clutch rollers, lugs formed on the outer periphery of the outer race member, a pivoted dog for engaging the lugs, means controllable by the movements of the gear sets to a reverse position for effecting the release of the dog out of engagement with the lugs, a spring pressed plunger for normally holding the pivoted dog into engagement with the lugs, and means positively locking the pivoted dog into engagement with the lugs on the outer periphery of the outer race member.

6. In combination with a motor vehicle transmission gear set of the variable type having a driven shaft, of a safety brake applied to the driven shaft comprising inner and outer race members, said inner race member being rigidly secured to the driven shaft, cam faces formed on the outer periphery of the inner race member in equi-distant spaced relations, opposite extensions formed between the cam faces, said opposite extensions being adapted to engage the inner periphery of the outer race member for spacing the same from the inner race member, a plurality of clutch rollers mounted between the cam faces and inner periphery of the outer race member, said clutch rollers having a central reduced portion, a retaining finger adapted to engage in the central reduced portion for holding the friction rollers out of engagement with the inner periphery of the outer race member, lugs formed on the outer periphery of the outer race member, a pivoted dog adapted to engage the lugs, a spring pressed plunger for normally holding the pivoted dog into engagement with the lugs, means operable by the movement of the gear sets to a reversed position to effect the movements of the pivoted dog out of engagement with the lugs, a second pivoted dog adapted to engage the first mentioned pivoted dog for locking the same in positive position, and means controllable from the dash board of the motor vehicle for locking the second mentioned dog into engagement with the first mentioned dog.

7. In combination with a motor vehicle variable speed transmission gear set having a driven shaft, of a safety brake applied to the driven shaft comprising inner and outer race members, clutch means interposed between the inner and outer race members, lugs formed on the outer periphery of the outer race member, said lugs provided with forward faces inclined from the line of pressure rearwardly from their inner edges to their outer edges, a pivoted dog provided with an angular contact face to cooperate with the inclined face of a selected lug, a spring pressed plunger abutting the pivoted dog for normally holding the pivoted dog into engagement with the lug, a cam pivoted on the pivoted dog adapted to engage the outer periphery of the outer race member, a tiltable link pivoted within the transmission casing having one end presented to the first and reverse speed sliding yoke rod, a cam face for tilting the tilting lever, a link connected to the opposite end of the tilting lever for connecting the cam whereby the cam may be caused to engage the outer periphery of the outer race member when the gear set is moved to the reverse position, a second pivoted dog mounted within the transmission casing adapted to engage the first mentioned pivoted dog and means controllable from the gear shifting rod of a motor vehicle for positively locking the second mentioned dog into engagement with the first mentioned dog and means controllable from the instrument board or other suitable place of a motor vehicle for positively eliminating the first and second mentioned dogs from their automatic no back brake engagement.

HENRY MORIER.